United States Patent [19]

Selby et al.

[11] Patent Number: 5,095,199
[45] Date of Patent: Mar. 10, 1992

[54] SCANNING HORIZON SENSORS USING AN INNER AND AN OUTER RADIATION SENSTIVE DETECTOR

[75] Inventors: Vaughn Selby, Lansing; James J. Fallon, Bronxville, both of N.Y.

[73] Assignees: Ithaco Incorporated, Ithaca; Space Sonics, Inc., White Plains, both of N.Y.

[21] Appl. No.: 405,442

[22] Filed: Sep. 11, 1989

[51] Int. Cl.$^5$ .............................................. H01J 40/14
[52] U.S. Cl. ................... 250/206.2; 250/203.6; 250/211 J; 250/347
[58] Field of Search ............. 250/211 R, 211 J, 203.1, 250/203.4, 203.6, 347, 352, 206.1, 206.2

[56] References Cited

U.S. PATENT DOCUMENTS

| | | | |
|---|---|---|---|
| 3,557,369 | 1/1971 | Waban | 250/203.6 |
| 4,118,622 | 10/1978 | David | 250/216 |
| 4,629,882 | 12/1986 | Matsuda et al. | 250/211 J |
| 4,654,518 | 3/1987 | Astheimer | 250/236 |
| 4,792,684 | 12/1988 | Savoca | 250/347 |

Primary Examiner—David C. Nelms
Assistant Examiner—S. Allen

[57] ABSTRACT

Method and apparatus for accurately determining the horizon position of a celestial body is disclosed in the form of inner and outer detector portions arranged generally-concentrically relative to an optical axis. Difference-determining electrical circuitry determines a difference between the outputs of the two detectors.

9 Claims, 7 Drawing Sheets

R1 = CIRCLE RADIUS
R2, R3 = RING RADII

R1: 1.000
R2: 1.500
R3: 1.135

SCANNING HORIZON SENSORS USING AN INNER AND AN OUTER RADIATION SENSTIVE DETECTOR

This invention relates to scanning method and apparatus, and, more particularly, to improved scanning techniques and apparatus useful in spacecraft scanning horizon sensors.

Navigation, and various other functions performed aboard spacecraft, depend upon spacecraft position and attitude. Position and attitude often are calculated using data from on-board scanning horizon sensors. A scanning horizon sensor is basically an optical system which focuses radiation onto a radiation detector. The detector provides an electrical signal, commensurate with the amount of radiation it receives as the optical axis of the horizon sensor is swept across a path containing a celestial body, such as Earth, the Earth's moon, or a star or the like. The scanner may respond to infrared, visible, and/or ultraviolet radiation in various applications. An exemplary embodiment which responds to infrared is described below. Infrared is normally used to avoid wide day/night diurnal radiance variations and horizon location errors which may be induced by other spectral regions. Movement of the sensor optical axis along a path which periodically scans across a celestial body may be accomplished either by a sensor fixed within the spacecraft which scans the celestial body due to spacecraft rotations, or by an on-board scanning mechanism—both such arrangements being very well known.

As the optical axis of the scanning sensor swings from space to an horizon or edge of a body such as Earth, an increasing amount of light is received by its photosensor, or radiation detector. The amount of received radiation increases as more and more of the field-of-view of the sensor optical system encompasses Earth, and when all of the field-of-view is focused on Earth, the radiation received by the sensor reaches a maximum, generally. In fact, the radiation will vary, ordinarily in small amounts, as the field-of-view scans across the Earth, since the Earth is not isoradiant. The amount of radiation received by the horizon scanner sensor will decrease as the optical system sweeps across the earth image back out to space.

Accurate computation of spacecraft position and attitude is possible only if a horizon scanner can provide precise information indicating the exact angular positions at which its field of view, or its optical axis, enters and leaves the image of a celestial body. However, prior horizon scanners have suffered from several problems which have prevented them from producing crossing signals at precise positions. As will be seen below, the precise manner in which received light changes as the field-of-view of a scanning sensor sweeps into or out of the image of a celestial body has great importance.

One object of the invention is to provide scanning apparatus which requires very few components.

Another object of the invention is to provide scanning method and apparatus having improved accuracy.

A further object of the invention is to provide scanning method and apparatus in which accuracy is not dependent upon scan rate.

Yet another, and very important object of the invention is to provide scanning method and apparatus in which accuracy is not dependent on the crossing angle which occurs as the sensor system crosses the horizon or edge being scanned.

A further object of the invention is to provide a scanning horizon sensor in which the method of horizon location (double differentiation), is accomplished without the injection of noise which accompanied prior art method and apparatus.

One object of the invention is to provide improved scanning method and apparatus which are readily applicable to a wide variety of scanning horizon sensors, including body-mounted horizon-crossing indicators, steerable horizon-crossing indicators, dithering edge-tracking sensors, line-scan sensors, conical-scan horizon sensors, and planar-scan horizon sensors.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figure 3:
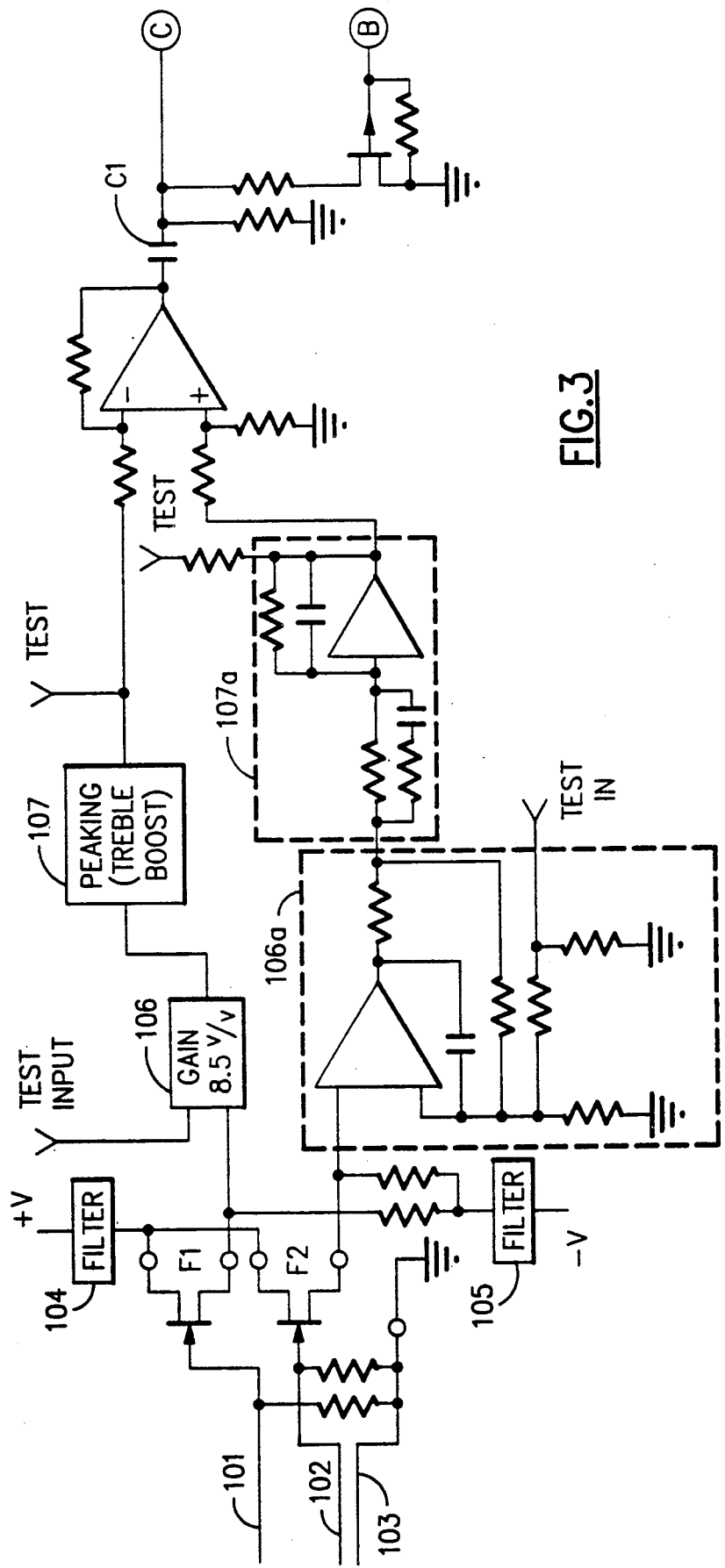

FIG. 3 comprises an electronic schematic diagram illustrating one exemplary form of horizon detector apparatus according to the invention.

Figure 4:
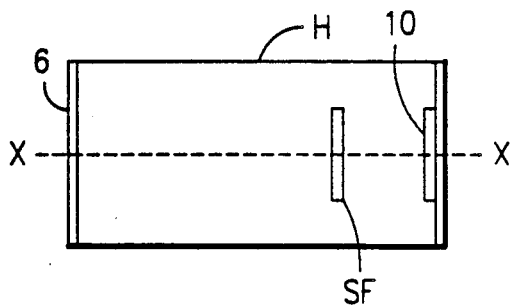

FIG. 4 diagrammatically illustrates one optical system which may be used with the present invention.

Figure 5A:
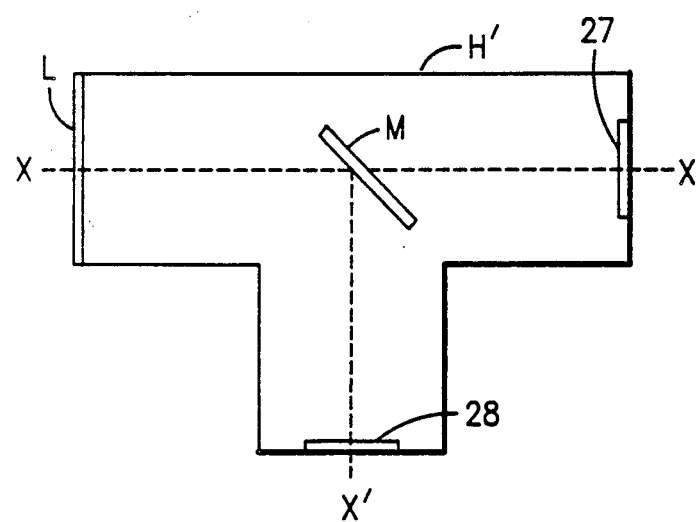
Figure 5B:
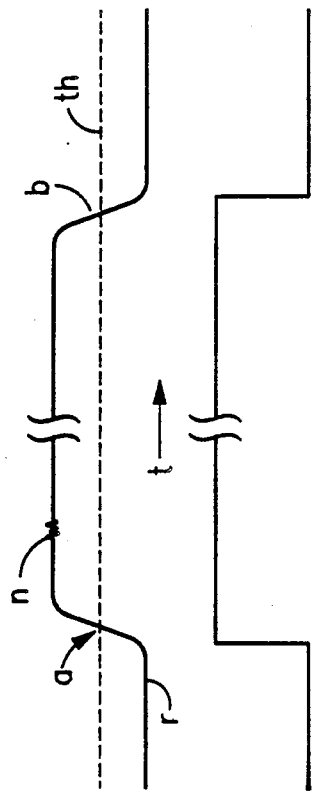

FIGS. 5a and 5b diagrammatically illustrate one alternative optical system of the invention.

Figure 6A:
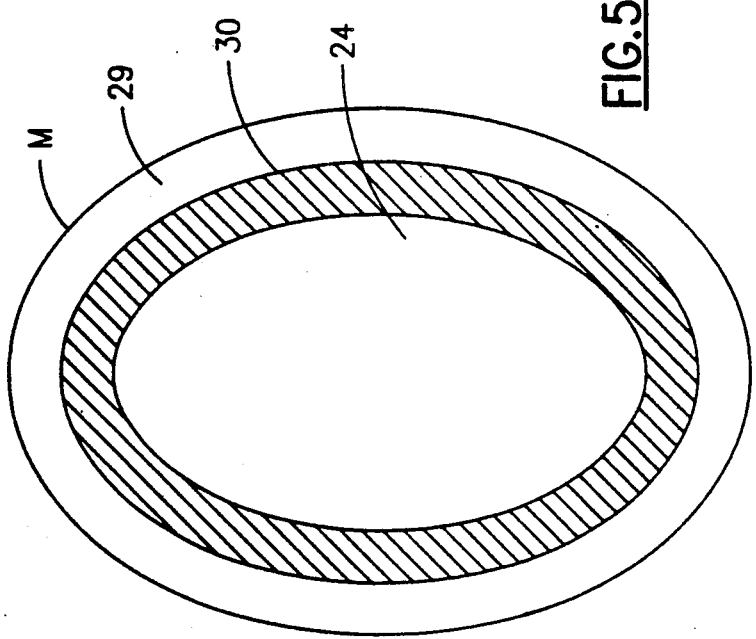
Figure 6B:
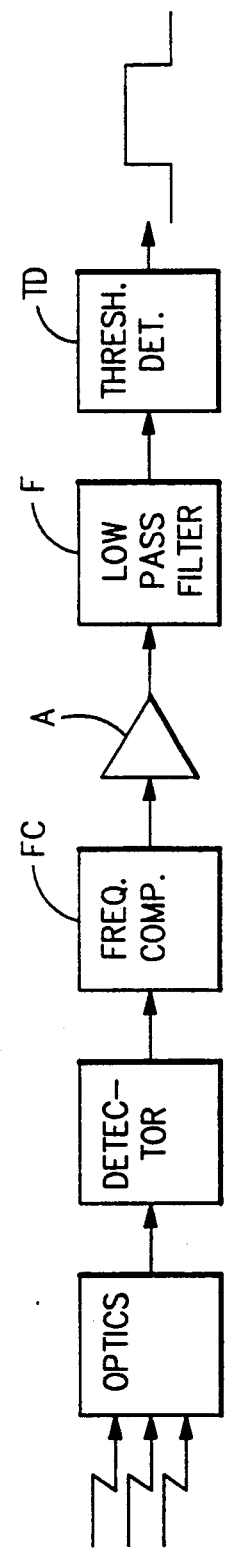

FIG. 6a and 6b are waveform diagrams and a block diagram, respectively, illustrating one type of prior art horizon scanner apparatus.

Figure 7A:
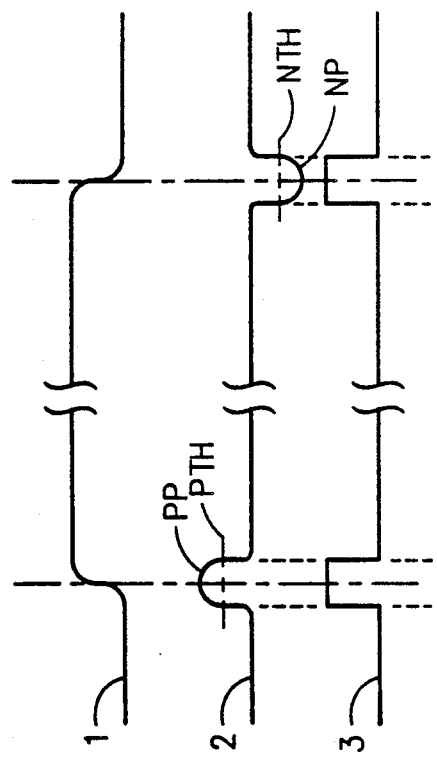
Figure 7B:
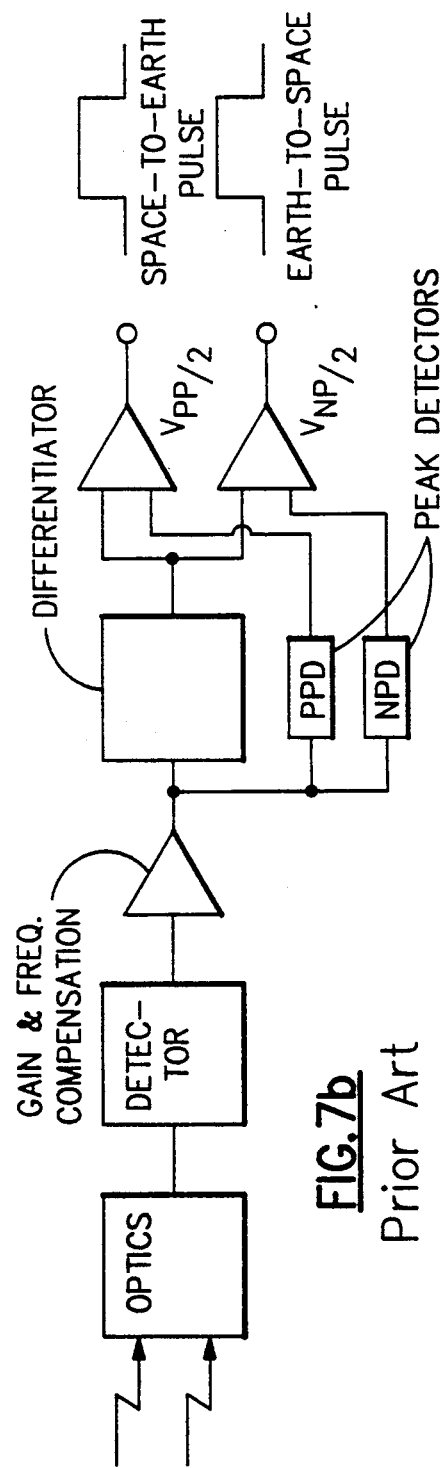

FIG. 7a and 7b are waveform diagrams and a block diagram, respectively, illustrating another form of prior art horizon scanner apparatus.

Figure 8A:
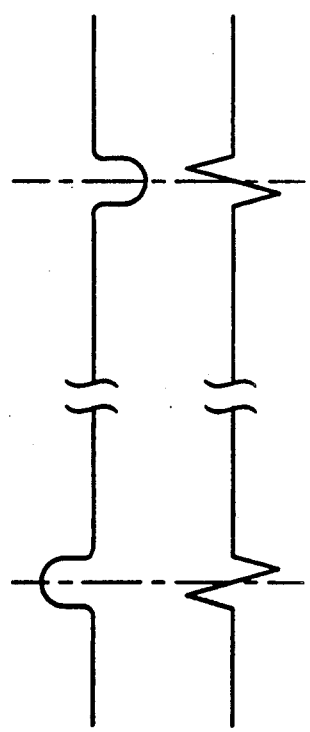
Figure 8B:
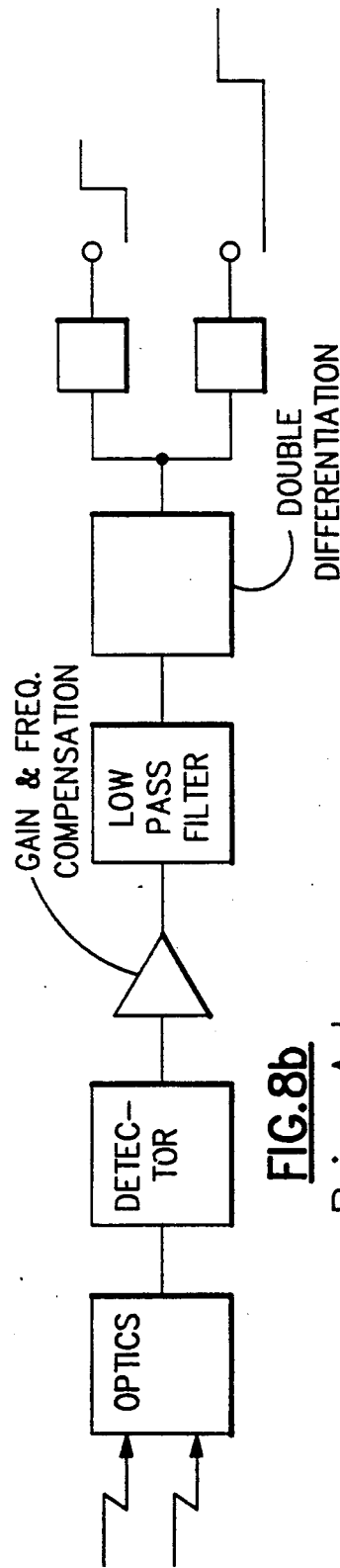

FIGS. 8a and 8b are waveform diagrams, and a block diagram, respectively, illustrating a further form of prior art horizon scanner apparatus.

Figure 9:
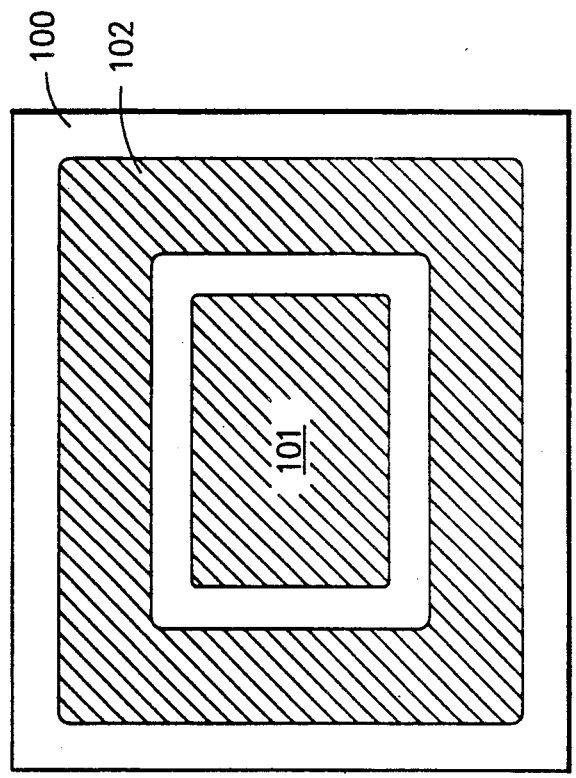

FIG. 9 illustrates one possible modification to the invention.

DESCRIPTION OF THE PRIOR ART

Typical prior scanning horizon sensors consist of a single infrared-sensitive detector element positioned at or near the focal point of a single-lens or multi-element optical system. The scanning horizon sensor of the present invention instead uses two detector elements, preferably a circular element concentrically surrounded by a ring element, with means for detecting the difference between the radiance signals provided by the two detector elements.

The broad idea of using two detector elements in a scanning horizon sensor for any purpose whatever, is not per se new. In some prior systems a second detector having temperature variation characteristics similar to those of the main detector has been used aboard a spacecraft, where it is subjected to the same temperatures as the main detector, but masked, i.e., not subjected to the radiance which the main detector receives, to compensate for ambient temperature variations. In some prior systems a masked second detector has been used to cancel microphonics. Neither of those mentioned prior systems used two detectors subjected to object radiance.

The broad idea of using two detectors subject to object radiance in a scanning horizon sensor is not completely new. Additional fields of view may have been employed to locate or guard against celestial bodies which have measurably different spatial or spectral characteristics. For example, a visible field of view may be added to locate the sun's horizon in a scanning horizon sensor where the main detector in the main field of view locates the Earth's horizon. Such a system does not determine the crossing of the horizon of a given celestial body based on the outputs of two detector elements subjected to radiance from that celestial body, as does the present invention, but rather detects horizons on two different celestial bodies.

Given output signals from a detector element, several different methods have been used to provide horizon location signals, and they will be described below in more detail. A known "doubly differentiating locator" technique obtains the second derivative of the earth radiance profile signal, providing steep inflection points corresponding to space-to-earth and earth-to-space crossings. While that prior technique overcomes clamp and peak detection problems associated with earlier locator techniques, it is still subject to error due to variations in spin rate and/or crossing angle, because the profile signal, and any processing thereof, whether analog or digital, operate in the time domain. Substantial noise is added during double differentiation of the signal, whether it is done by digital or analog means.

In accordance with the present invention, a need for digital or analog signal processing to provide double differentiation and fixed percentage location is eliminated, and such functions are accomplished extremely simply, and without injection of noise, by optical computing.

Given the output signal from a scanning horizon sensor, various known signal-processing methods (called "locators") exist for determining horizon crossings. The operation and structure of one prior art system are depicted in FIGS. 6a and 6b. As shown in FIG. 6b, the output from the detector is compensated, if necessary, for non-uniform frequency response by frequency compensation circuitry shown as a block at FC. The signal is then amplified and filtered by an amplifier A and a filter shown as a block at F. The filter has a cutoff frequency chosen to achieve optimum slope-to-noise ratio for a given, limited, range of spin rates. The resultant filter output waveform is a bandwidth-limited replica of the integrated radiance during the scan path across the earth. The filter output is applied to a threshold detector shown as a block at TD, and detector TD provides the Boolean earth pulse. In FIG. 6a curve r represents the general nature of the radiance signal obtained as an exemplary sensor having a circular field of view intercepts the earth at a, and returns from earth to space at b. If one operates a switch at a fixed threshold, indicated by dashed line th in FIG. 6a, one obtains an earth pulse of a Boolean nature such as that shown in the lower portion of FIG. 6a. While the radiance profile shown at r in FIG. 6a is generally shown as a clean, noise-free signal, the signal in fact always carries some amount of noise, as diagrammatically indicated at n in FIG. 6a. It will be appreciated that noise occurring during the rise and fall of the radiance signal at a and b, respectively, may shift the times at which the Boolean signal rises and falls, resulting in inaccuracy. The fixed threshold level is set to guarantee reliable horizon-crossing detection for all conditions of interest. The space-to-earth and the earth-to-space horizon crossings lie at the leading and trailing edges of the Boolean earth pulse. This locator technique has the advantage of operating over a wide spin rate range, but it has rather poor accuracy due to variations in earth radiance and/or crossing angle, either of which result in an error in the Boolean earth pulse.

The poor accuracy resulting in the system of FIGS. 6a and 6b due to earth radiance variations can be improved by use of what are termed percentage locators. These locators detect a fixed percentage point on the leading and trailing edge horizon transitions of the detector signal. This is accomplished by determining a reference value for the incoming analog earth profile signal, and thresholding at a preselected percentage of the reference value.

One further signal processing technique is known as a differentiating percentage locator. Its operation and usual structure are illustrated in FIGS. 7a and 7b. As shown in FIG. 7b, the amplified and frequency-compensated detector signal is applied to a pair of comparators which are biased to switch at half the amplitudes of the positive and negative peaks, respectively. The detected radiance profile is shown as the upper waveform at 1 in FIG. 7a. The differentiated earth edges are generated by passing a frequency compensated detector signal through an electronic bandpass filter, to provide the waveform shown at 2 in FIG. 7a. The positive and negative peaks of that waveform are detected by electronic peak detectors PPD and NPD. Half-amplitude values of the positive and negative peaks are applied to respective comparators of the differentiated signal correspond to the 50% amplitude points of the radiance profile. The outputs from the thresholding process are leading and trailing edge pulses. Horizon crossings are thus located at fixed percentage thresholds. Using 25% and 75% thresholds, the midpoint between each pair of threshold crossings corresponds to the 50% point of the original radiance waveform.

The differentiating percentage locator technique is capable of excellent accuracy; however, the large noise gain injected by electronic analog or digital differentiation requires matching of the bandpass filter to the earth pulse rise time to achieve good slope-to-noise ratio. Further, the amplitude of the differentiated pulse varies with spin rate and with scan geometry. Even with automatic thresholding, this locator technique has a limited spin rate range. Peak detection requires a fixed energy-level integration (or clamping) process. That integration insures that the peak detector does not clamp to the noise. The shape of the radiance profile, and its corresponding first derivative, influence the percentage of the peak integrated by clamp. That introduces additional error.

A further, more recently employed type of locator technique is commonly called a double-differentiating locator. Please refer to FIGS. 8a and 8b. A waveform which is the first derivative of the radiance profile, like waveform 2 in FIG. 7a (and shown again, in FIG. 8a) is differentiated again to give a second-derivative waveform of the type shown at 3 in FIG. 8a. As shown in FIG. 8b, a frequency-compensated signal is applied via a low-pass filter to a double differentiator. The output of the double differentiator is applied to a negative-going zero-crossing detector and to a positive-going zero-crossing detector. The negative-going zero-crossing detector provides a transition indicating the leading edge of the horizon, i.e., interception of the horizon of the earth or other celestial body, and the positive-going zero-crossing detector provides a transition indicating the trailing edge, as the field-of-view returns to space.

The steep points of inflection in FIG. 8a indicate the space-to-earth and earth-to-space horizon crossings. The double-differentiating technique effectively has the same inherent accuracy as the previously-described differentiating percentage locator, but it avoids errors associated with clamps and other forms of peak detection. However, variations in spin rate, and variations in crossing angle still comprise sources of error. Further, substantial noise is injected by double differentiation, whether it is done by analog electronic circuitry or by digital processing. It is important to note that the derivatives of the profile signal are derivatives with respect to time. In the optical computing system of the present invention, the second derivative is obtained as a function of angle rather than as a function of time.

DESCRIPTION OF THE INVENTION

Figure 1:
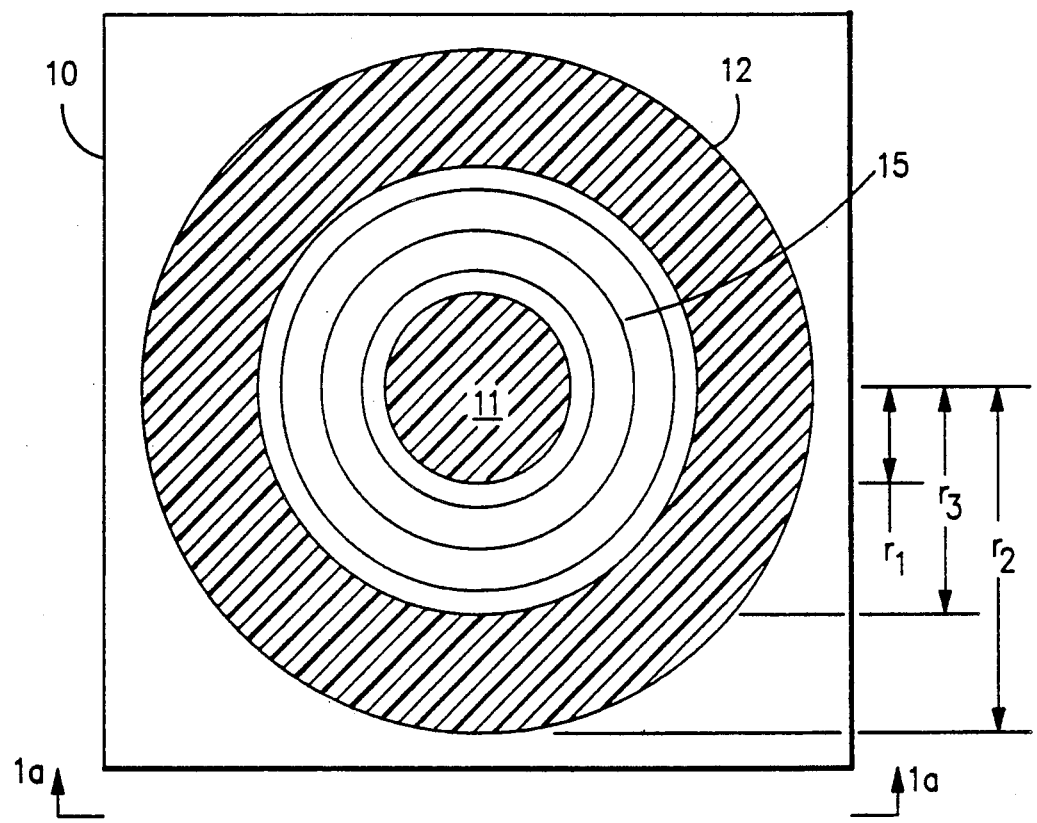
FIG. 1 is a diagrammatic top view of one exemplary form of detector assembly in accordance with the invention.
Figure 1A:
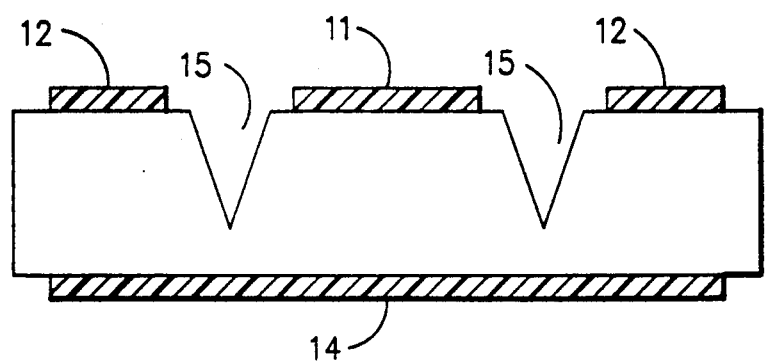
FIG. 1a is a cross-section view taken at lines 1a—1a in FIG. 1.

In FIG. 1 a substrate 10, shown with a rectangular shape and which may comprise a lithium tantalate flake, for example, carries a first central active area 11 shown having a circular shape and a radius $r_1$, and a second annular or ring-shaped active area 12 having an outer radius $r_2$ and an inner radius $r_3$, with ring area 12 being concentrically located relative to circular area 11. A back electrode 14 (FIG. 1a) is not visible in FIG. 1. An annular V-groove 15 is preferably etched in the surface of the substrate which carries elements 11 and 12 to reduce heat transfer, or thermal crosstalk, between active elements 11 and 12.

The area $A_1$ of central detector element 11 is obviously given by:

$$A_1 = \pi r_1^2 \text{ and}$$

the area of ring 12 is given by:

$$A_2 = \pi(r_2^2 - r_3^2).$$

To understand the operation of the preferred detector assembly of the invention, it is necessary to recognize the manner in which radiation falling within a circle varies as the circle moves across a line (horizon) which has no radiation on one side and a given amount of radiation on the other side. The amount of radiation detected at a given time manifestly depends upon how much area of the circle has crossed the line.

If a circular detector of radius r gradually moves from viewing outer space to viewing a celestial body from which radiation is received, the active detector area obviously varies from zero to $\pi r^2$. The precise manner in which that area varies with horizon line crossing can be shown to be:

$$A = \tfrac{1}{2}[x\sqrt{r^2 - x^2} + r^2 \arcsin(x/r) + \pi r^2/2] \quad (1)$$

Figure 2:
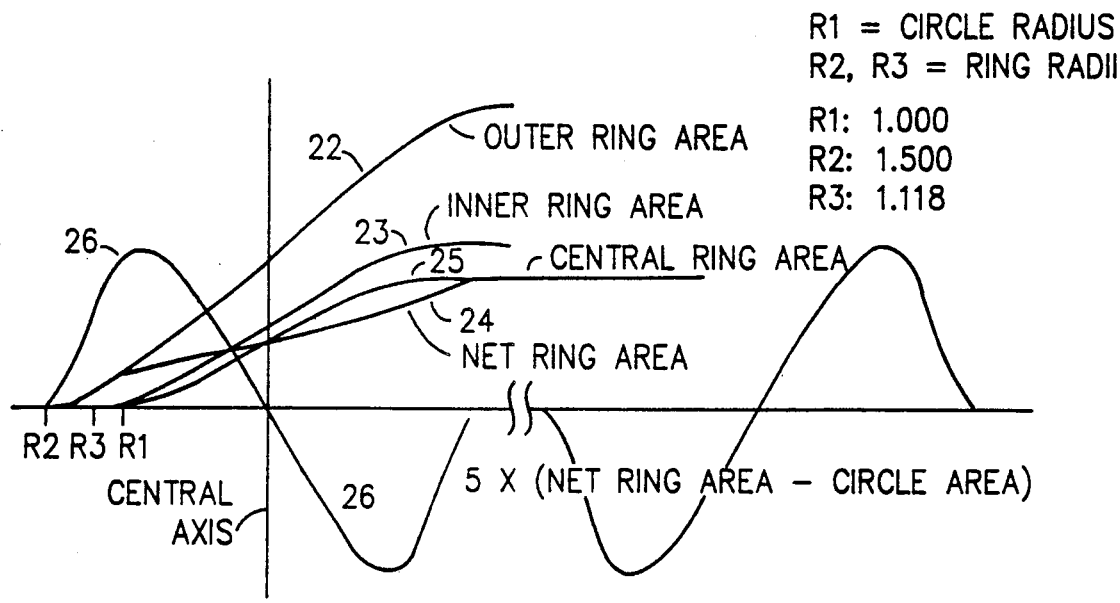
FIGS. 2, 2a and 2b are a group of curves illustrating how the irradiated areas of a ring and a circle vary as they move across a horizon line.

In FIG. 2 the manner in which the area of a circular detector of radius $r_2$ crosses a line is graphically depicted by curve 22. The manner in which the area of a circular detector of lesser radius $r_3$ varies is shown by curve 23. If one subtracts ordinates of curve 23 from those of curve 22, one obtains curve 24. It should be apparent that subtracting the area of the smaller circle (of radius $r_3$) from the area of the larger circle (of radius $r_2$), one obtains the area of a ring having an outer radius of $r_2$ and an inner radius $r_3$. Thus curve 24 in FIG. 2 illustrates how radiance impinging on a ring detector element, such as that shown at 12 in FIG. 1, varies as that ring element sweeps from space across a horizon line to receive earth radiation.

Curve 25 in FIG. 2 similarly illustrates how the irradiated area of a circular detector element of radius $r_1$ (such as element 11 in FIG. 1) varies as it is swept across a horizon line. It will be noted that variation in area, as a circle crosses a line, is common to curves 22, 23, 25 and equation (1). Curves 22, 23 and 25 all have the same general shape, though with different starting (non-zero) points, and different maxima at different abscissa values due to their different radii.

Now, in accordance with a most important concept of the invention, consider the difference in area (or received radiation) between that received by the ring detector (line 24) and that received by the central circle detector (line 25). That difference is plotted (with a magnification of about five compared to the other values) as curve 26 in FIG. 2. From curve 26 one can see that the difference initially grows rapidly in a positive direction as radiation is initially detected only by the outer ring detector, but that the difference then falls rapidly as radiation is detected by the central circle detector. The difference falls to zero, then temporarily becomes negative, and then becomes zero, as indicated by curve 26. The difference value of curve 26 passes through zero precisely when half of the ring and half of the circle are irradiated, since the ring and the circle are presently assumed to have the same area (as will be further discussed below). The values of curves 24 and 25 reach a maximum value, and retain that maximum value, (if any variation in celestial body radiance is ignored) until the sensor sweeps from the celestial body back out to outer space.

Curves 24 and 25 are shown reaching maximum values. Those values pertain until the sensor field-of-view leaves the earth. It will be understood that the area (and radiation) values for curves 24,25,26 as the field-of-view returns to outer space are mirror-images of the values shown on the left side of FIG. 2, curve 26 being shown as an example.

FIG. 2 represents a special case wherein the circular and ring areas have the same gain per unit area, i.e., the same voltage output per unit area of incident radiation, so that they provide equal voltage outputs when their areas are equal and their entire areas are subjected to radiation. Their areas will be equal, of course, when:

$$r_1^2 = r_2^2 - r_3^2 \quad (2)$$

It is not necessary that the ring and circle have the same area in order to provide an output such as that shown by curve 26 in FIG. 2. If, for example, the ring had twice the area of the circle, the same output (line 26) would be obtained if the output of the ring detector element were scaled into a difference-determining means (ordinarily a differential operational amplifier) with half the gain with which the circle detector element were scaled into the difference-determining means. In one embodiment, $r_1=0.3$ mm., $r_2=0.5$ mm., and $r_3=0.4$ mm.

What is crucially important to note is that while the relationships described by equation (1) and illustrated in FIG. 2 do depend upon ring-circle geometry, they are wholly independent of timing considerations. The curves of FIG. 2 faithfully apply whether the movement of the image of the sensor assembly across the horizon line takes milliseconds or hours. It should be further noted that obtaining an output dependent upon the difference between the signals from the two detector elements also cancels microphonics.

Figure 2A:
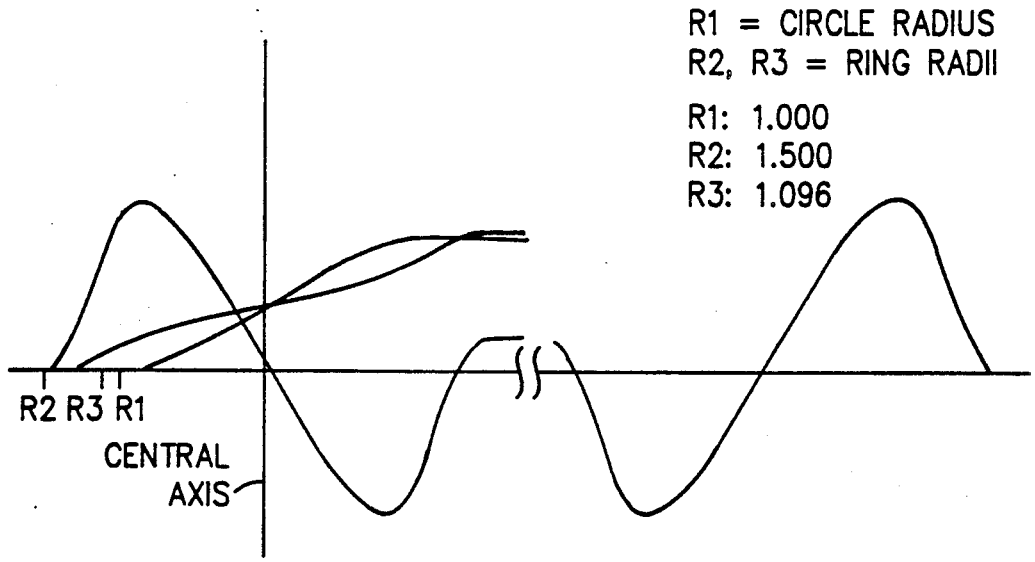
Figure 2B:
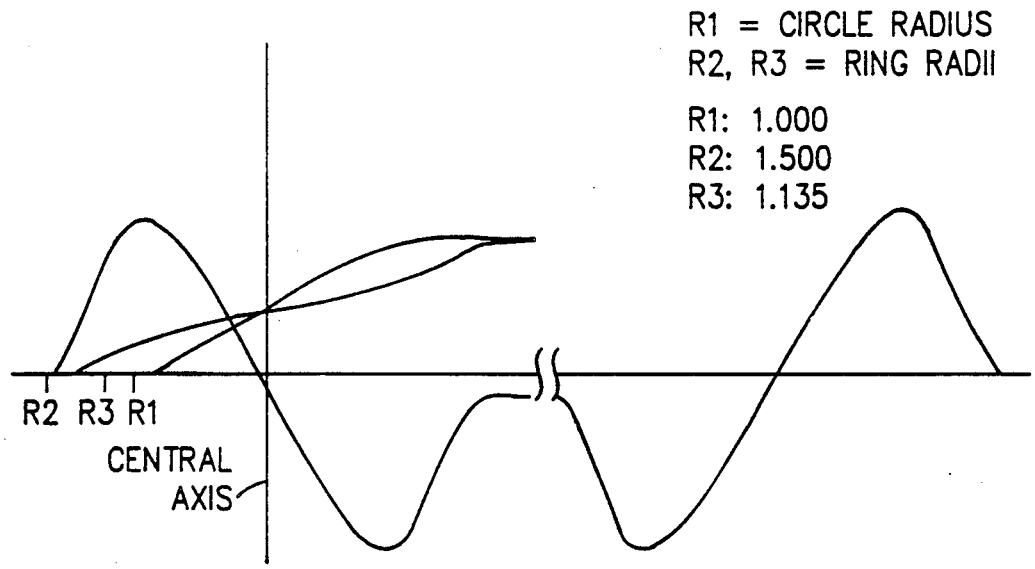

FIG. 2a is a diagram similar to FIG. 2 but wherein the circle area input (i.e., the circle area times its gain) slightly exceeds the ring area input. That results in the zero-crossing of difference signal 26 occurring slightly after the horizon line crosses the central optical axis of the sensor assembly, and in a finite (shown as positive) signal being continuously present as the sensor field-of-view sweeps across the earth. FIG. 2b is a diagram similar to FIGS. 2 and 2a but wherein the ring area input (i.e., the ring area times its gain) slightly exceeds the circle area input. That results in the zero-crossing of difference signal 26 occurring slightly before the horizon line crosses the central optical axis of the sensor assembly, and in a finite (shown as negative) signal being continuously present as the sensor field-of-view sweeps across the earth.

One should note that the systems of FIGS. 2a and 2b are time-independent, just like the system depicted in FIG. 2. The horizon line positions at which the zero-crossings occur in FIGS. 2a and 2b are predetermined, and not dependent upon spin rate.

The curves of FIG. 2 assume that a circular field-of-view moves perpendicularly to and across a straight horizon line. The assumption that the horizon line is straight will be recognized to be quite justifiable for low altitudes. It will be apparent that the shape of the curves in FIG. 2 will change materially, due to horizon lines being curved, only at altitudes far greater than those associated with usual earthbound satellites.

It can be shown that if a circular field-of-view moves to and across a horizon line in a non-perpendicular direction, the general shapes of the waveforms plotted in FIG. 2 will not change, but the waveforms will be linearly lengthened by a factor of $(\sin \alpha)^{-1}$, where $\alpha$ is the angle of incidence. Importantly, the angle of incidence, or crossing angle, does not affect the location within the waveform of the zero crossing detected by the method and apparatus of the present invention.

FIG. 1 refers to a two-detector element assembly having ring and circle coatings on a common substrate, and the ordinary use of such an assembly would be, as shown in FIG. 4, within a housing H, with radiation directed by an optical system L to the detector assembly, along an optical axis x—x and through a spectral filter SF.

It is not necessary, however, that the ring detector and the circle detector be mounted in the same plane or on a common substrate. In the system of FIGS. 5a and 5b, a mirror M mounted along the principal optical axis x—x at a 45° angle to the saggital optical plane. Mirror M has a central elliptically-shaped aperture or opening 24 (FIG. 5b) which allows radiation to pass along the principal axis to create a circular field-of-view on a central circle detector at 27. A reflective outer elliptical ring surface 29 creates a circular ring which is imaged upon detector 28. An annular field stop or mask shown at 30 is optional. It may be used to separate the two fields of view to provide an optimal spatial relation between the fields of view, but since the aperture loss caused by such a field stop increases noise equivalent angle, it likely will be omitted in some embodiment of the invention. It may be noted that thermal crosstalk becomes negligible between detectors 27 and 28 in FIG. 5a, so that no radial space need be left for the V-groove 15 of FIG. 1, and the inner radius of the outer ring detector can closely approach the outer radius of the control circle detector. Further mirrors could be used, if desired, to bend the optical axis, in accordance with standard optical practice. In either FIG. 4 or FIGS. 5a-5b, optical system L may comprise a single or multiple-element lens system. A beam-splitter could be substituted for mirror M in FIG. 4b, but the system would function with a substantially degraded signal-to-noise ratio.

In FIG. 3a the signal from circle detector element 11 is shown connected via line 101 to the gate of a field-effect transistor ("FET") F1, the signal from ring detector element 12 is connected via line 102 to the gate of FET F2, and the back electrode 14 is connected via line 103 to a ground terminal. Though N-channel FETs are shown, P-channel FETs or any high input impedance amplifier may be substituted. FETs F1 and F2 are shown supplied from $+V$ and $-V$ supply voltages through decoupling filters 104,105.

The circle element output from F1 is shown applied via a gain circuit 106 and a frequency compensation circuit 107 to the negative input line of differential operational amplifier A1. The ring element output from F2 is shown applied via a gain circuit 106a and a frequency compensation circuit 107a, to the positive input line of op-amp A1. Gain circuit 106 and frequency compensation circuit 107 shown in block form may take the forms of circuits 106a, 107a shown in greater exemplary detail.

It will be understood that the application of the circle and ring signals to opposite-sense input lines of amplifier A1 causes that amplifier to provide an output signal commensurate with the difference between its two input signals, i.e., a signal of the nature shown as curve 26 in FIG. 2. That signal is shown applied via a capacitor C1 to provide AC-coupling and DC restoration, to eliminate any error which drift in the previously-mentioned operational amplifiers might otherwise cause. The DC restoration time constant ordinarily will be made a long value, such as five seconds or more, so that droop during an earth crossing will be negligible.

The essence of the invention is the provision of a signal, such as a zero-crossing in the output of amplifier A1, which accurately signals a horizon crossing, independently of spin rate and crossing angle. The output of the difference-determining means (amplifier A1) may be connected to operate latches, triggers and like circuits and processed in a variety of ways known in the art.

The voltage resulting at terminal A may be made to be substantially independent on spin rate for a wide range of spin rates.

While central element 11 in FIG. 1 has been disclosed as comprising a full or filled circular element, it will become apparent at this point that it could, if desired, have a missing central area, so that the detector assembly, rather than comprising a circle within a ring, instead comprised an inner ring located inside an outer ring, though no advantage is seen in such an arrangement, and indeed, a worse signal-to-noise ratio would, occur. In a modified embodiment of the invention shown in FIG. 9, a substrate 100 carries a generally-rectangular central electrode area 101 and a generally-rectangular ring electrode area 102 surrounding the central area 101. Such an embodiment may find use in systems whose scanning always occurs in a known direction. The two shapes need not necessarily be rectangular. A hexagon or octagon situated within a hexagon or octagon ring could be used, for example.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A scanning horizon sensor which comprises, in combination: optical means, and a detector assembly, said optical means having an optical axis and being operative to direct received radiation onto said detector assembly, wherein said detector assembly comprises an inner radiation-sensitive detector element and an outer radiation-sensitive detector element surrounding and spaced from said inner element relative to said optical axis, and difference-determining means connected to said detector elements for deriving a signal commensurate with a difference between the radiation received by said inner detector element and the radiation received by said outer detector element.

2. A sensor according to claim 1 wherein said inner detector element comprises a circular element centered on said optical axis, and said outer detector element comprises an annular element concentrically spaced on said optical axis relative to said inner detector element.

3. A sensor according to claim 1 wherein said inner and outer detector elements comprise first and second electrode coatings carried on a common substrate.

4. A sensor according to claim 1 wherein said difference-determining means comprises respective impedance-conversion means connected to said inner and outer detector elements, and differential amplifier means connected to the impedance-conversion means.

5. A sensor according to claim 1 wherein the radiation-sensitive areas of said inner and outer detector elements, and the gains with which signals from said detector elements are respectively connected to said differencing means are so selected that the signal produced by differencing means is substantially zero both (1) when both of said detector elements are receiving no substantial radiation and (2) when the entire areas of both of said detector elements are receiving a given amount of radiation.

6. A sensor according to claim 3 wherein the effective areas of said first and second electrode coatings are substantially equal.

7. A sensor according to claim 3 having a groove provided in said substrate between said first and second electrode coatings to decrease thermal conductance from one of said electrode coatings to the other of said electrode coatings.

8. The method of detecting a horizon crossing which comprises the steps of:
moving an optical field-of-view across a detector assembly having an inner radiation-sensitive detector element and an outer radiation-sensitive detector element surrounding and spaced from said inner element relative to the optical axis of said optical field-of-view; and
deriving a signal commensurate with a difference between the radiation being received by said inner detector element and the radiation received by said outer detector element.

9. The method of claim 8 wherein said step of moving said field-of-view comprises moving said field-of-view across inner and outer radiation-sensitive elements mounted on a substrate in substantially the same plane.

* * * * *